(12) United States Patent
Andrews

(10) Patent No.: US 7,406,816 B2
(45) Date of Patent: Aug. 5, 2008

(54) PROTECTIVE HELMET FOR HORSES

(76) Inventor: Nancy I. Andrews, 71 Reveille La., Sandpoint, ID (US) 83864

( * ) Notice: Subject to any disclaimer, the term of this patent is extended or adjusted under 35 U.S.C. 154(b) by 111 days.

(21) Appl. No.: 11/253,931

(22) Filed: Oct. 19, 2005

(65) Prior Publication Data
US 2007/0084156 A1    Apr. 19, 2007

(51) Int. Cl.
*B68B 7/00* (2006.01)
(52) U.S. Cl. .................................................. 54/80.1
(58) Field of Classification Search ............... 54/80.1, 54/80.2, 80.3; 119/850
See application file for complete search history.

(56) References Cited

U.S. PATENT DOCUMENTS

| 87,938 | A | 3/1869 | Humphrey |
| 127,820 | A | 6/1872 | Wilson |
| 342,186 | A | 5/1886 | Corley |
| 669,909 | A | 3/1901 | Young |
| 743,704 | A * | 11/1903 | Flynn .................. 54/80.3 |
| 4,040,239 | A | 8/1977 | Powell |
| 5,321,937 | A | 6/1994 | Hamilton |
| 5,456,215 | A | 10/1995 | Deutscher et al. |
| 5,713,188 | A | 2/1998 | Chisholm |

* cited by examiner

*Primary Examiner*—Rob Swiatek
(74) *Attorney, Agent, or Firm*—Clark A. Puntigam; Jensen & Puntigam, P.S.

(57) ABSTRACT

The protective helmet includes a hard plastic shell member which is configured to fit over the top of the horse's head, with openings for the ears of the horse. The shell member has a particular configuration, with a front edge which fits around the top of the eyes of the horse and curves slightly downwardly between the eyes, side edges which extend from the front edge to the rear of the horse's head, and a rear edge which is located a distance down the back of the neck of the horse. An interior member is positioned on the interior surface of the shell member, made of soft, pliable material which conforms to the surface configuration of the horse's head when the helmet is secured thereto. A strap assembly extends between the respective sides edges of the shell member, including a buckle or other attachment portion which permits adjustable securement of the helmet on the horse's head.

7 Claims, 3 Drawing Sheets

PROTECTIVE HELMET FOR HORSES

TECHNICAL FIELD

This invention relates generally to protective equipment for horses, and more particularly concerns a protective helmet for use on horses.

BACKGROUND OF THE INVENTION

The importance of protecting a horse's head during certain activities such as, for instance, transporting of the horse, has been recognized. Other activities involve possible hazardous circumstances, such as mounted police action. There have been a variety of structural approaches in providing protective helmets for horses. Many helmets are quite simple and cover only small portions of the horse's head. In some cases, the helmets are actually more decorative than protective and provide only minimal actual protection. On the other hand, many helmets are structurally complex, often covering too much of the horse's head and/or are too expensive. In addition, many known helmets are uncomfortable for the horse and raise the possibility of the horse injuring itself as it tries to get the helmet off.

Hence, there is a need for a horse helmet which provides good protection for the horse's head, particularly during transport, but for other activities as well, but is simple in design, relatively inexpensive, and is at least reasonably comfortable for the horse.

SUMMARY OF THE INVENTION

Accordingly, the present invention is a protective helmet for horses, comprising: a single-piece hard shell member, configured to fit over the top of and partially around the horse's head, with openings therein for the ears of the horse, the shell member having a front edge which fits around the top of the eyes of the horse and extends slightly downwardly between the eyes, opposing side edges which extend from the front edge to the rear of the horse's head, below the ears, and a rear edge, which extends across the rear of the neck of the horse a distance downwardly from the top of the horse's head; an interior member positioned at an interior surface of the shell member, made of soft, pliable material which is capable of conforming to the surface configuration of the horse's head when the helmet is secured thereon; and a strap assembly which extends between the respective side edges of the shell member, providing a snug fit for the protective helmet on the horse's head.

BEST MODE FOR CARRYING OUT THE INVENTION

Figure 1:
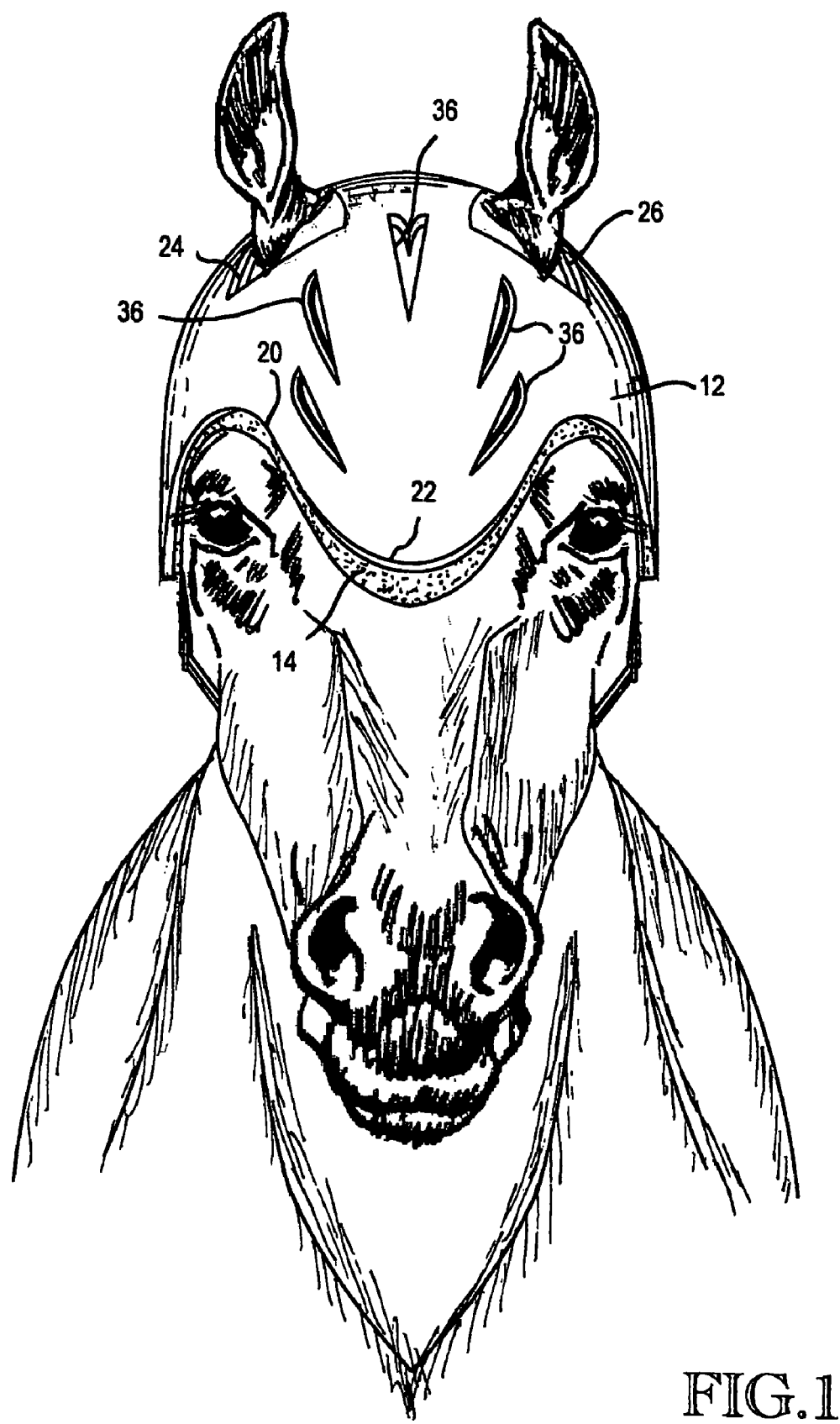
FIG. 1 is a front view of the horse helmet, in place on a horse.

The figures show a protective helmet for horses. The helmet is configured to provide significant protection for a horse's head during transport or other activities where such protection may be advisable, while at the same time is at least reasonably comfortable for the horse, such that the horse does not become preoccupied with removing the helmet.

The protective helmet shown generally at 10 comprises three main portions; a hard plastic outer shell 12, a soft inner lining which is capable of conforming to the exterior configuration of the horse's head 14, and a strap assembly 16 which extends beneath the head of the horse and holds the helmet securely in place on the horse's head.

Outer shell 12 is made from a hard plastic material such as polyurethane, similar to, for instance, a ski or motorcycle helmet. Typically, it is a single, unitary piece. Also typically, the outer shell will be approximately ⅛ inch thick, although this could be varied. The configuration of outer shell 12 is important. Outer shell 12 includes a front edge 20 which extends around the top of the horse's eyes, and then curves down somewhat between the eyes of the horse, as shown. Curved portion 22 of front edge 20 between the horse's eyes generally extends slightly below the horse's eyes at its lowest point, although this can be varied to some extent as well. Towards the top of the outer shell 12 on opposing sides of the helmet, above the eye portions of the front edge, are two triangular openings 24 and 26, through which the ears of the horse extend when the helmet is in place.

Figure 2:
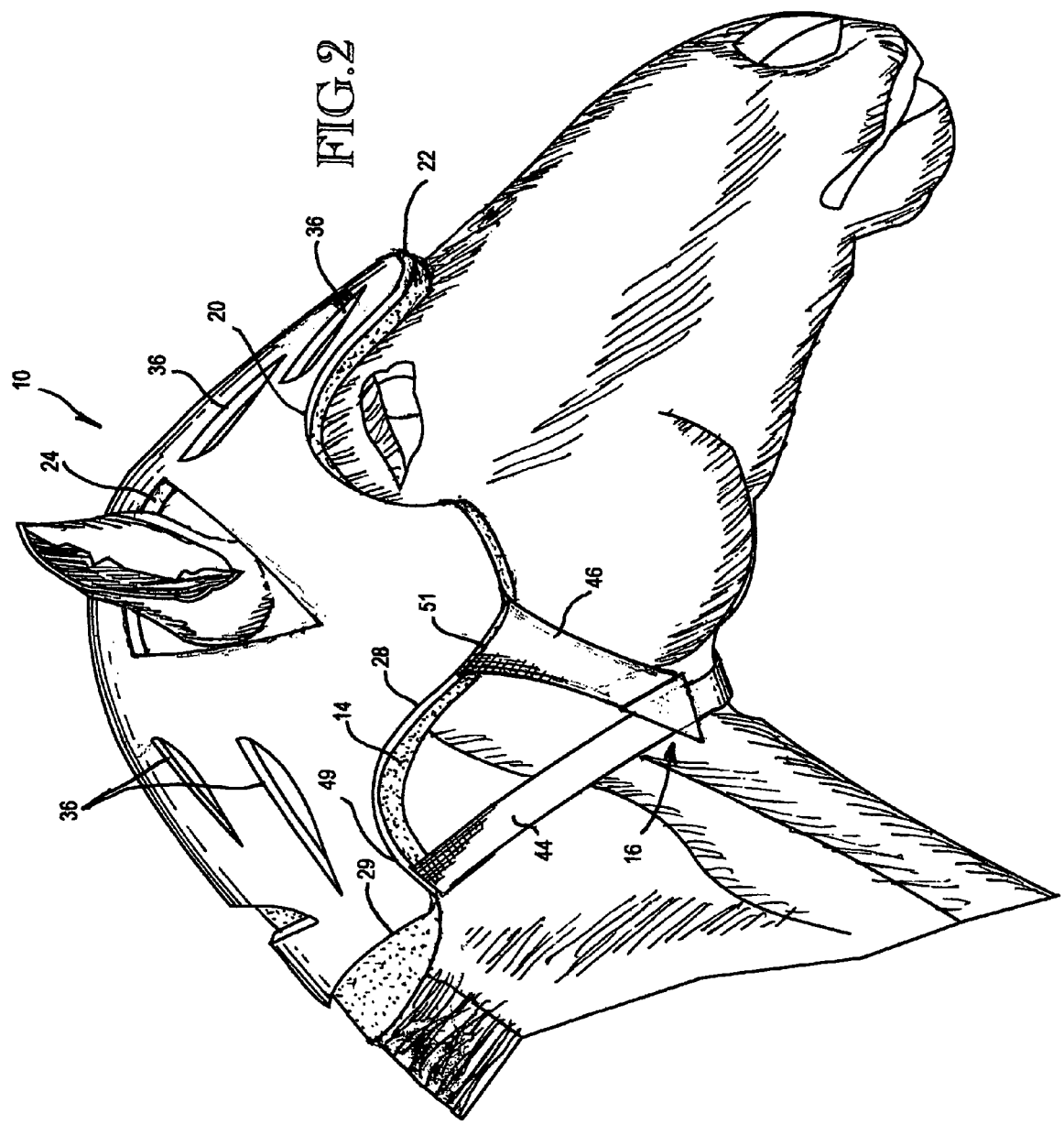
FIG. 2 is a side view of the horse helmet.
Figure 3:
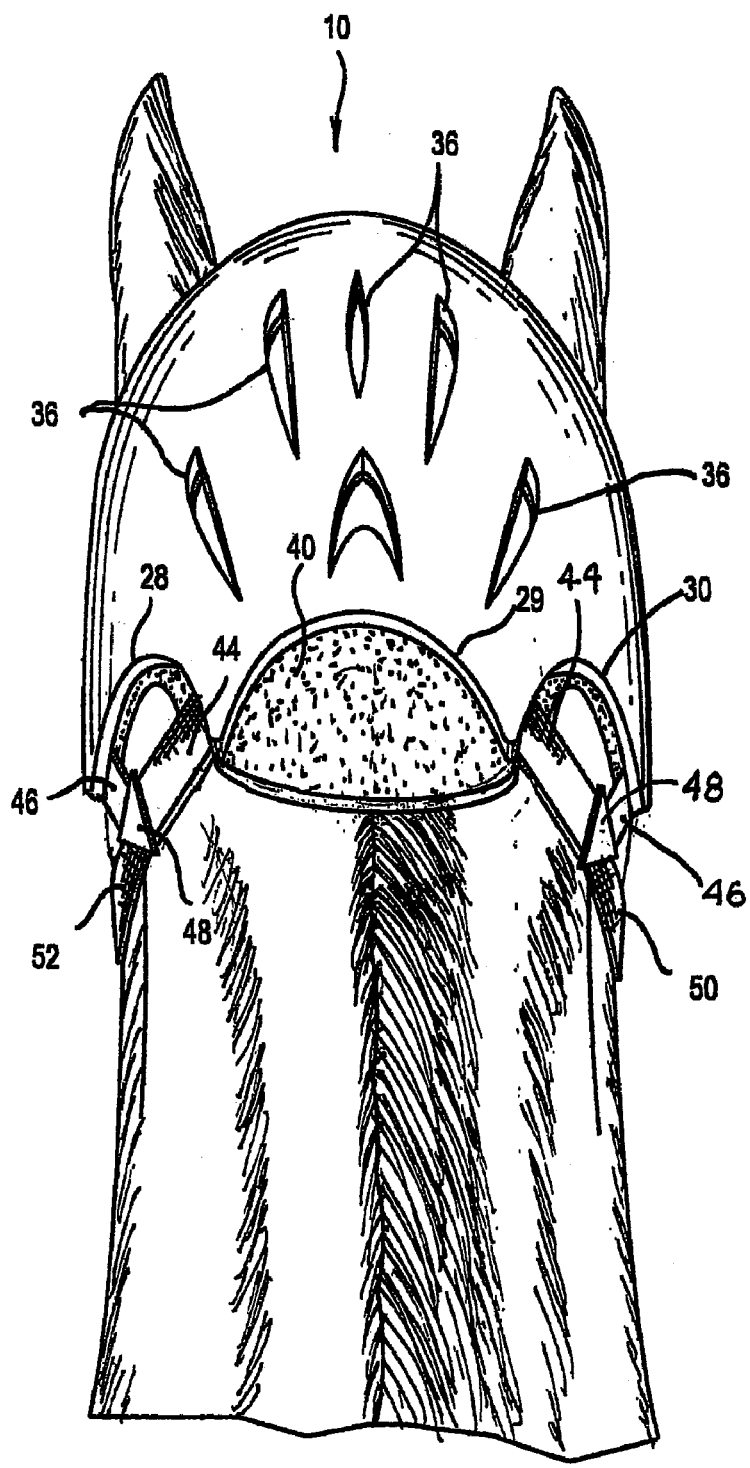
FIG. 3 is a rear view of the horse helmet.

Referring specifically to FIG. 2, the outer shell 12 further includes two opposing side edges 28 and 30 which are generally identical and extend between the front edge 20 and a rear edge 29. The side edges 28 begin approximately 2 inches or so below the eyes of the horse, down the side of the horse's head, beginning with a slightly convex curve over a first portion of the side edge to a point 51, below the ear opening. The side edge then curves concavely until it intersects with rear edge 29 approximately perpendicular thereto. Rear edge 29 (FIG. 3) is concave between the two side edges 28, 30.

Outer shell 12 has a plurality of small openings 36-36 therethrough. Typically, the openings 36 are in the rear portion of the helmet (behind the ear openings) and also in the front portion of the helmet, generally in a central region thereof. The openings 36-36 can vary significantly in shape and number and are for air circulation.

The second portion of the helmet 10 is the inner liner 14. In the embodiment shown, inner liner 14 is a foam cushioning material approximately one-half inch thick. The foam cushioning material generally follows the outline of the outer shell, except at the rear edge 29 of the outer shell, where the inner liner 14 has a convex edge, extending below the concave rear edge, such that a portion 40 of inner liner 14 is exposed. This exposed portion 40 of the inner liner provides additional protection for the rear neck of the horse without the discomfort of a hard shell extending too far down the back of the horse's neck. While, as explained above, outer shell 12 is, in the embodiment shown, a single unitary piece of plastic, the inner liner 14 could be a single piece of foam material, or it could be individual pieces. Inner liner 14 is removable, typically secured to the interior surface of the outer shell 12 by attachment strips of adhesive-type material, such as Velcro® strips.

Inner liner 14 also has openings therethrough which are in registry with openings 36-36 in the outer shell 12. The inner liner comprises a specific foam material which conforms to the configuration of the horse's head when the helmet is in place on the horse. The material must be flexible and pliable as well as soft. This results in the helmet being comfortable for the horse when the helmet is in place, and protects against the horse attempting to remove the helmet or becoming preoccupied therewith.

The third portion of helmet 10 is the strap assembly 16. The strap assembly includes strap portions 44,46, which extend from each side edge of the helmet. Strap portions 44,46, extend, respectively, as shown most clearly in FIGS. 2 and 3, from the vicinity of the rear end 49 of each side edge, and from a point near the front end of each side edge. The two straps 44,46 are secured to a metal triangle connecting piece 48.

A cross-strap 50 extends downwardly from connecting member 48. The free end of the cross-strap 50 includes a buckle or a Velcro® patch which mates with a similar member on a connecting strap 52 from the other side edge of the helmet. The buckle or Velcro® element and the matching member on the other connecting strap 52, when fitted together, produce a snug fit for the helmet on the horse.

In use, when connecting straps 50, 52 are undone from each other, the helmet 10 is slipped on the head of the horse, allowing the ears of the horse to protrude through openings 24, 26. The helmet will typically then be adjusted for proper positioning; connecting straps 50, 52 are then connected together to produce a comfortable, yet snug fit on the head of the horse.

The helmet may be colored to identify particular uses of the helmet, if desired. For instance, for dangerous or hazardous situations, the helmet could be black; in sporting events, various desired colors could be used to match the uniforms of the riders, and for military use, camouflage colors could be used.

The helmet itself, as indicated above, is valuable for the specific event of transporting horses; however, it could be used on police horses in hazardous situations or in military applications or in competitive sporting events such as jumping or polo, as well as for abused and neglected horses which might otherwise be inclined to injure themselves in their stalls, etc.

Accordingly, a new horse protective helmet has been shown and described which provides a high level of protection, while at the same time is comfortable for the horse, easy to put on and take off, and relatively inexpensive to manufacture.

Although a preferred embodiment of the invention has been disclosed for purposes of illustration, it should be understood that various changes, modifications and substitutions may be incorporated in the invention without departing from the spirit of the invention, which is defined by the claims which follow:

What is claimed is:

1. A protective helmet for horses, comprising:
    a rigid hard shell member, configured to fit over the top of and partially around the horse's head, with openings therein for the ears of the horse, the shell member having a front edge which fits around the top of the eyes of the horse and extends slightly downwardly between the eyes, opposing side edges which each extend from a beginning point located below the eyes of the horse down the side of the horse's head, beginning with a convexly curved portion, followed by a concavely curved portion which intersects with a rear edge portion which extends across the rear of the neck of the horse a distance downwardly from the horse's head;
    an interior member positioned at an interior surface of the shell member, made of soft, pliable material which is capable of conforming to the surface configuration of the horse's head when the helmet is secured thereon; and
    a strap assembly which extends between the respective side edges of the shell member, providing a snug fit for the protective helmet on the horse's head.

2. The protective helmet of claim 1, wherein the hard shell member is plastic.

3. The protective helmet of claim 2, wherein the shell member is approximately ⅛-inch thick and the interior member is approximately ½-inch thick.

4. The protective helmet of claim 1, wherein the strap assembly includes two strap subassemblies, each strap subassembly including first and second strap portions which extend downwardly from spaced points on each side edge of the plastic shell member, to a rigid buckle and a third strap portion which extends downwardly from the rigid buckle, wherein the third strap portion from each strap subassembly includes a member to secure the two third strap portions together in an adjustable manner.

5. The protective helmet of claim 1, wherein the shell member and the interior member include openings therein which are in registry, positioned at selected locations over the respective surfaces thereof.

6. The protective helmet of claim 1, wherein the rear edge of the shell member is concave in configuration and the rear edge of the interior member is slightly convex in configuration, leaving a portion of the interior member extending below the rear edge of the shell member, wherein otherwise the interior member has approximately the same configuration as the shell member.

7. The protective helmet of claim 1, wherein at least portions of the interior member are removably secured to the interior surface of the shell member.

\* \* \* \* \*